March 13, 1951
J. H. YOUNG
2,545,332
BALE TIE FORMING MACHINE
Filed March 17, 1947
2 Sheets-Sheet 1
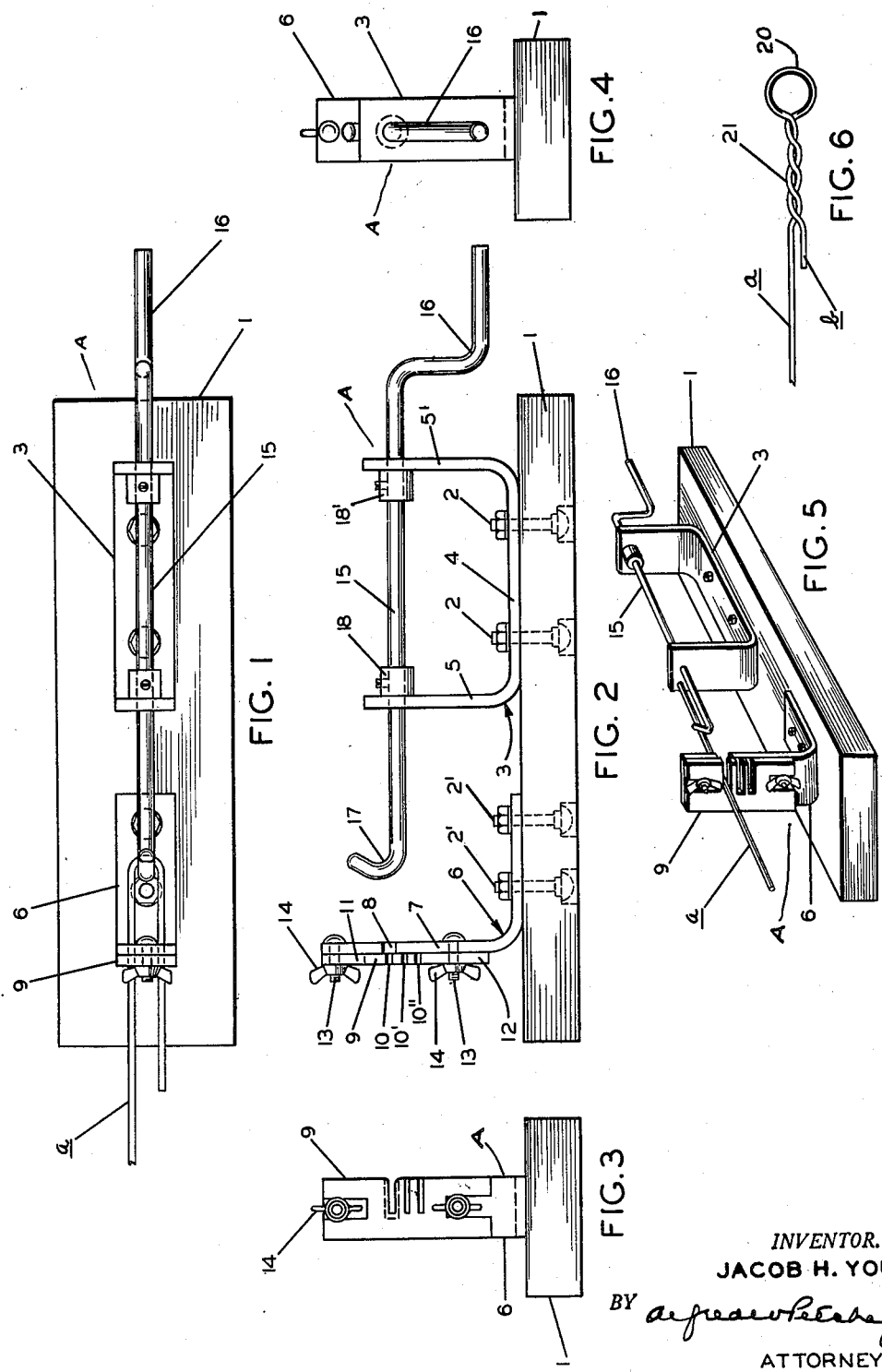
INVENTOR.
JACOB H. YOUNG
BY
ATTORNEY March 13, 1951  J. H. YOUNG  2,545,332
BALE TIE FORMING MACHINE
Filed March 17, 1947  2 Sheets-Sheet 2
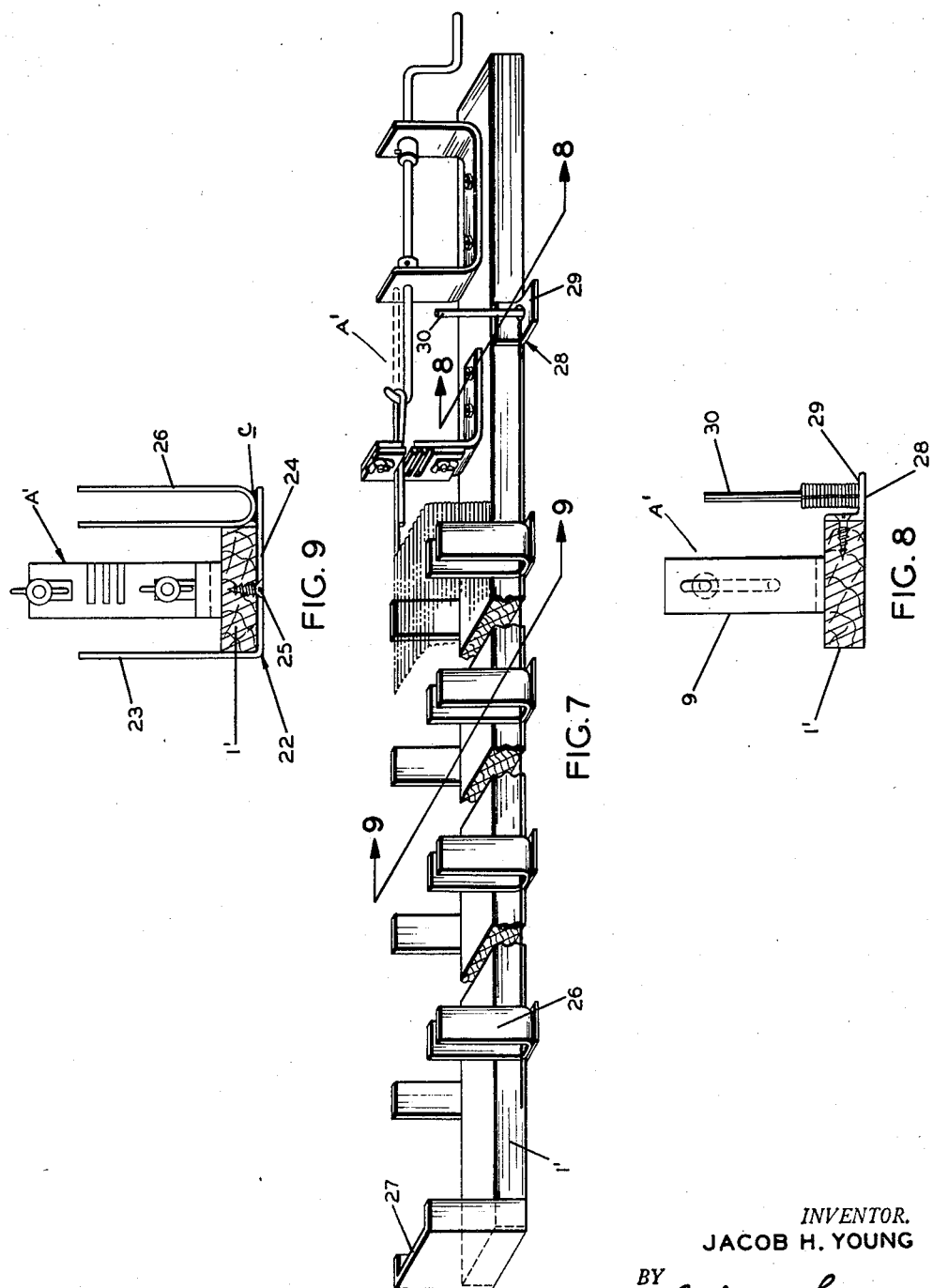
INVENTOR.
JACOB H. YOUNG
BY
ATTORNEY.

Patented Mar. 13, 1951

2,545,332

UNITED STATES PATENT OFFICE 2,545,332

BALE TIE FORMING MACHINE

Jacob H. Young, Webster Groves, Mo.

Application March 17, 1947, Serial No. 735,154

6 Claims. (Cl. 140—73)

This invention relates generally to wire-forming machines and, more particularly, to bale tie-forming machines.

Heretofore, farmers have been in the practice of purchasing baling wire in bulk and fastening it crudely by hand around bales of hay and straw, or buying pre-formed bale ties from supply houses at a very substantial price. Most farmers dislike the inefficient method of manually twisting the opposite ends of a piece of baling wire together with pliers or other hand tools as the bale is being formed, and bale ties of this crude type cannot be readily used in most existing types of baling machines. On the other hand, because of the high cost of the pre-formed bale ties, most farmers would prefer to manufacture their own bale ties in spare moments in the evening or during the long winter months when the weather prevents outside work. For these reasons, a compact, inexpensive, and easily manipulable machine for forming bale ties has long been needed.

It is hence the primary object of the present invention to provide a bale tie-forming machine which is reliable and durable in operation, economically produced and is sturdy and rugged in construction.

It is a further object of the present invention to provide a bale tie-forming machine which, by its simplicity, requires no developed skill to operate.

With the above and other objects in view, my invention resides in the novel features of form, construction, arrangement, and combination of parts presently described and pointed out in the claims.

In the accompanying drawings (two sheets)—

Figure 1 is a top plan view of a bale tie-forming machine constructed in accordance with and embodying the present invention;

Figure 2 is a side elevational view;

Figure 3 is a front elevational view;

Figure 4 is a rear elevational view;

Figure 5 is a perspective view of the bale tie-forming machine;

Figure 6 is a bale tie produced by the present invention;

Figure 7 is a perspective view of a modified form of bale tie-forming machine constructed in accordance with and embodying the present invention;

Figure 8 is a transverse sectional view taken along line 8—8 of Figure 7; and

Figure 9 is a transverse sectional view taken along line 9—9 of Figure 7.

Referring now in more detail, and by reference characters to the drawings, which illustrate practical embodiments of my invention, A designates a bale tie-forming machine having an oblong rectangular base member 1 formed preferably of wood or any other suitable material. Mounted by means of bolts 2 upon the upper face of the base member 1, and extending along the longitudinal axis thereof, is a U-shaped member 3 having a horizontal bight portion 4 and vertically upwardly extending legs 5, 5'. Similarly mounted, by means of bolts 2', in forwardly spaced alignment with the U-shaped member 3, is an L-shaped member 6 having a vertical leg 7 provided with a horizontal slot or jaw 8 extending inwardly from one vertical margin of the leg 7, and being substantially wider than the diameter of the heaviest baling wire that the machine is designed to accommodate. Shiftably mounted in surface abutting position against the outer face of the leg 7 is a chuck plate 9 having three optional jaw slots 10, 10', 10'', for respectively accommodating wire of different gauges, and being provided at its opposite end with vertical slots 11, 12, for slidable engagement with the forwardly projecting ends of retainer bolts 13, in turn provided, on their outer ends, with wing nuts 14.

Rotatably mounted in, and extending through, the legs 5, 5', of the U-shaped member 3, in coaxial alignment with the slot 8, is a crank 15 provided at its rear end with a handle 16, and at its forward end with a hook portion 17. Fixed upon the crank, for rotative abutment against the inner faces, respectively, of the legs 5, 5', are set collars 18, 18', to prevent axial translation or movement of the crank 15 as it is turned.

In operation, the desired slot or jaw of the chuck plate 9 is aligned with the slot 8 by proper adjustment and is secured in such adjusted position by tightening of the wing nuts 14. A piece of baling wire a, of predetermined length, is fed therethrough, until the end e abuts against the forwardly presented face of the leg 5. The end e is thereupon bent backwardly through the aligned slot 8 and the selected jaw slot 10 of the chuck plate 9 (as shown in Figures 1 and 5), forming a tight reverse bend about the hook 17. The crank handle 16 is then rotated causing the parallel sections of the bent wire a to intertwine, thereby forming a closed eye 20 and twisted shank 21. The bale tie wire so prepared is then ready for use.

It is to be particularly noted that the distance between the hook 17 and the forwardly presented face of the leg 5, and between the hook 17 and the rearwardly presented face of the leg 7, is such that a substantial portion of the reversely bent end of wire a will project through slots 8 and 10, and the twisted end of the finished bale tie will be of adequate length to insure proper strength.

If desired, a modified form of bale tie-forming machine A' may be provided, as shown in Figure 7, being substantially similar to the previously described bale tie-forming machine A and having a base I' which is longer than the base I and extends forwardly for a distance sufficient to accommodate the entire length of a bundle of uniformed bale tie wires. The base I' is provided, at spaced points along its length, with a plurality of L-shaped brackets 22 having vertical arms 23 and horizontal arms 24 extending beneath the base I' and being secured thereto by countersunk flat-headed screws 25, and, welded, as at c, to extending portions of the horizontal arms 24, are U-shaped brackets 26. Rigidly secured at the extreme end of the base I' is an upstanding channel-shaped end stop 27, and similarly secured on the side of the base I' adjacent the forming mechanism is an angle bracket 28 having a horizontally projecting flange 29 provided with a vertical steel pin 30 for receiving the formed eye 20 of a finished bale tie. As bale ties are formed on the machine A, they are removed and stored within the trough formed by the U-shaped brackets 26 with the eye 20 of said formed bale ties encircling steel pin 30, and held in place thereby.

It should be understood that changes and modifications in the form, construction, arrangement, and combination of the several parts of the bale tie-forming machine may be made and substituted for those herein shown and described without departing from the nature and principles of my invention.

Having thus described my invention, what I claim and desire to secure by Letters Patent is:

1. A bale tie-forming machine comprising a base member, a U-shaped bracket secured upon the upper face of the base member and having a pair of upwardly extending spaced parallel arms, a rod rotatably mounted in and extending horizontally between said arms, being provided on one end with a handle and on the other end with a hook, and an auxiliary bracket also mounted upon the upper face of the base member having an upwardly extending leg disposed in spaced parallel relation to the arms of the bracket and spaced outwardly from the hook, said leg being provided with a jaw-forming slot for receiving the end portions of a piece of baling wire bent around the hook and backwardly upon itself whereby said end is held against rotation as the handle is turned and is thereby caused to twist in the formation of a twisted shank and closed eye.

2. A bale tie-forming machine comprising a base member, a U-shaped bracket secured upon the upper face of the base member and having a pair of upwardly extending spaced parallel arms, a rod rotatably mounted in and extending horizontally between said arms, being provided on one end with a handle and on the other end with a hook, and an auxiliary bracket also mounted upon the upper face of the base member having an upwardly extending leg disposed in spaced parallel relation to the arms of the bracket and spaced outwardly from the hook, said leg being spaced outwardly from the hook by a distance substantially less than the distance between the hook and the adjacent arm of the bracket, said leg being provided with a jaw-forming slot for receiving the end portions of a piece of baling wire bent around the hook and backwardly upon itself whereby said end is held against rotation as the handle is turned and is thereby caused to twist in the formation of a twisted shank and closed eye.

3. A bale tie-forming machine comprising a base member, a U-shaped bracket secured upon the upper face of the base member and having a pair of upwardly extending spaced parallel arms, a rod rotatably mounted in and extending horizontally between said arms, being provided on one end with a handle and on the other end with a hook, an auxiliary bracket also mounted upon the upper face of the base member having an upwardly extending leg disposed in spaced parallel relation to the arms of the bracket and spaced outwardly from the hook, said leg being spaced outwardly from the hook by a distance substantially less than the distance between the hook and the adjacent arm of the bracket, said leg being provided with a jaw-forming slot for receiving the end portions of a piece of baling wire bent around the hook and backwardly upon itself whereby said end is held against rotation as the handle is turned and is thereby caused to twist in the formation of a twisted shank and closed eye, and a plate slidably mounted on said leg and having a plurality of slots for optional registration with the jaw-forming slot whereby to adapt said jaw-forming slot for the accommodation of different sizes of wire.

4. A bale tie-forming machine comprising a base member, a U-shaped bracket secured upon the upper face of the base member and having a pair of upwardly extending spaced parallel arms, a rod rotatably mounted in and extending horizontally between said arms, being provided on one end with a handle and on the other end with a hook, means on the rod for preventing axial translation of the rod during rotative movement thereof, and an auxiliary bracket also mounted upon the upper face of the base member having an upwardly extending leg disposed in spaced parallel relation to the arms of the bracket and spaced outwardly from the hook, said leg being spaced outwardly from the hook by a distance substantially less than the distance between the hook and the adjacent arm of the bracket, said leg being provided with a jaw-forming slot for receiving the end portions of a piece of baling wire bent around the hook and backwardly upon itself whereby said end is held against rotation as the handle is turned and is thereby caused to twist in the formation of a twisted shank and closed eye.

5. A bale tie-forming machine comprising a base member, a U-shaped bracket secured upon the upper face of the base member at one end thereof and having a pair of upwardly extending spaced parallel arms, a rod rotatably mounted in and extending horizontally between said arms, being provided on one end with a handle and on the other end with a hook, an auxiliary bracket also mounted upon the upper face of the base member having an upwardly extending leg disposed in spaced parallel relation to the arms of the bracket and spaced outwardly from the hook, said leg being provided with a jaw-forming slot for receiving the end portions of a piece of baling wire bent around the hook and backwardly upon itself whereby said end is held against rotation as the handle is turned and is thereby caused to twist in the formation of a twisted shank and closed eye, said base member having an extended end portion of substantial length, and rack-forming means mounted on such extended end portion.

6. A bale tie-forming machine unitarily comprising a base member, a U-shaped bracket secured upon the upper face of the base member at one end thereof and having a pair of upwardly extending spaced parallel arms, a rod rotatably mounted in and extending horizontally between said arms, being provided on one end with a handle and on the other end with a hook, an auxiliary bracket also mounted upon the upper face of the base member having an upwardly extending leg disposed in spaced parallel relation to the arms of the bracket and spaced outwardly from the hook, said leg being provided with a jaw-forming slot for receiving the end portions of a piece of baling wire bent around the hook and backwardly upon itself whereby said end is held against rotation as the handle is turned and is thereby caused to twist in the formation of a twisted shank and closed eye, said base member having an extended end portion of substantial length, first rack-forming means adapted to receive uniformed wire, and second rack-forming means adapted to receive finished bale ties.

JACOB H. YOUNG.

REFERENCES CITED

The following references are of record in the file of this patent:

UNITED STATES PATENTS

| Number | Name | Date |
|---|---|---|
| 177,221 | Dederick | May 9, 1876 |
| 227,804 | Martyn | May 18, 1880 |
| 228,905 | Kilmer | June 15, 1880 |
| 262,797 | Lenox | Aug. 15, 1882 |
| 396,651 | Franco | Jan. 22, 1889 |
| 419,917 | Brainard | Jan. 21, 1890 |
| 524,657 | Van Ormer | Aug. 14, 1894 |
| 551,153 | Beals | Dec. 10, 1895 |
| 605,930 | Stauffer | June 21, 1898 |
| 617,253 | Manville et al. | Jan. 3, 1899 |
| 875,654 | Christensen | Dec. 31, 1907 |
| 1,151,639 | Whitworth | Aug. 31, 1915 |
| 1,253,782 | Bryan | Jan. 15, 1918 |
| 1,272,068 | McClure | July 9, 1918 |
| 1,522,373 | Knight | Jan. 6, 1925 |
| 1,638,868 | Miller | Aug. 16, 1927 |
| 1,769,330 | Bull | July 1, 1930 |
| 1,901,273 | Taylor | Mar. 14, 1933 |